C. L. Barnes,
Wood Auger.
N° 9,398.    Patented Nov. 16, 1852.
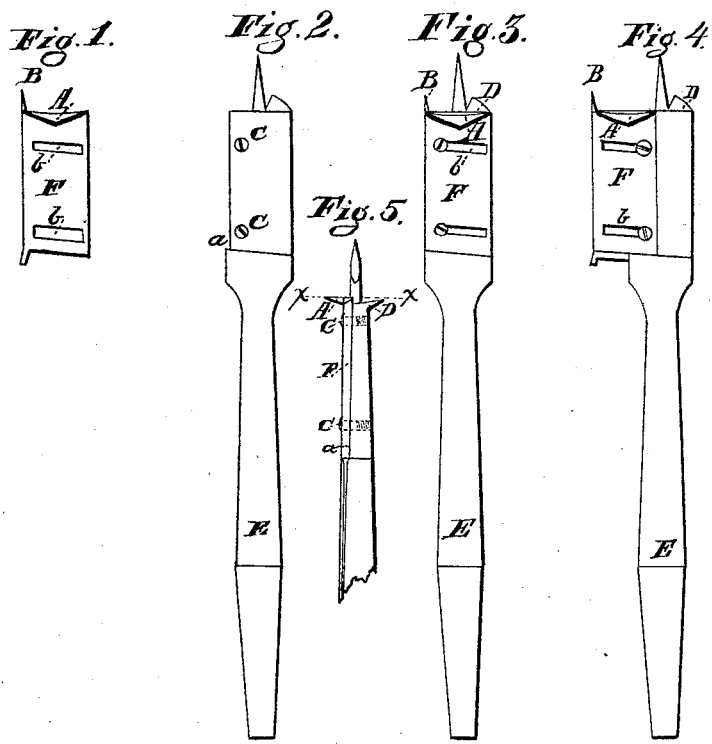

UNITED STATES PATENT OFFICE.

CHAS. L. BARNES, OF NEW YORK, N. Y.

EXPANDING BIT.

Specification of Letters Patent No. 9,398, dated November 16, 1852.

*To all whom it may concern:*

Be it known that I, CHARLES L. BARNES, of the city, county, and State of New York, have invented certain new and useful Improvements in Expansion Center-Bits for Boring Holes of Different Sizes with the Same Cutters; and I do hereby declare the following to be a full, clear, and exact description of the same, reference being had to the accompanying drawings, making a part thereof, in which—

Figure No. 1, represents the movable part of the bit detached. No. 2, represents the stationary part of the bit. No. 3, represents the two parts (Nos. 1 and 2) arranged together for boring the smallest sized hole. No. 4, represents the bit expanded to its utmost limit for boring the largest sized hole, which is about double that of the smallest size, and No. 5, represents a view from one of the edges of the bit stock when expanded as in No. 4.

Similar letters in the several drawings denote the same parts.

The nature of my invention consists in so combining the stationary and movable parts of an expansion bit, as that it shall always retain a cutting edge entirely across the hole to be bored whether small or large, and so that at the same time, the cutting point on the movable part shall always stand parallel with the line of the hole to be bored, by which means I am enabled to bore a perfectly smooth hole, and prevent tearing of the wood, or clogging: Also in giving to the movable part of the bit, a rising and falling motion, as the bit is contracted or expanded, so that the lip on the movable part shall be the cutter when boring the largest size holes (the other lip being at rest), and the lip on the stationary part, be the cutter when boring the smallest size holes, the first named lip being rest, or vice versa, by which means I am enabled to have and use lips formed to suit the periphery of large or small holes without changing the parts of the bit.

To enable others skilled in the art to make and use my invention, I will proceed to describe the same with reference to the drawings.

The shank E, of the bit, may be made in any of the well known forms of common boring bits, and a recess is formed on one of the sides and edges of the blade of the bit, as seen at *a* Fig. No. 2, into which the movable part of the bit F, Fig. No. 1, fits. On the stationary part of the bit Fig. No. 2, is formed one cutting lip D, which when the bit is boring the smallest size holes, becomes the working or cutting lip—the cutting point B, on the movable part F, cutting or scoring out the periphery of the hole. The movable part F, fits and slides in the recess formed in the stationary part, and is adjustable by means of the slots *b*, and set screws C, and has a cutting lip A, and a cutting point B formed upon it, as seen at Figs. Nos. 1, 3, 4. The slots *b* in the movable part F, are cut inclining in the direction of the outward movement of said part, so that as said part F, is moved out to enlarge the size of the hole to be bored, it will gradually fall below the cutting lip D of the stationary part, until, when moved out to its utmost limit, which would be to a distance sufficient to cut a hole double the size of the smallest size hole, when the lip A, becomes the cutting lip, as seen in Fig. No. 5, where the dotted line *x x*, represents the cutting line of the lip A, and its relative position with regard to the other cutting lip D,—thus by alternating the cutting lips, I am enabled to form them so as to conform in shape more nearly to the circumference of the various sized holes to be bored, and consequently have no tearing of the wood, as every portion would be cut away by the lips, and no choking of the cutters. It will be perceived that, the cutting point B, on the movable portion F, serves the purpose of scoring or marking out the circumference of the hole, and as it always stands perfectly parallel with the hole to be bored whatever its size, it cuts the wood perfectly smooth, which cannot be the case where the two parts diverge from a given point, as then the cutting point would stand at an inclination with the hole, and force the bit out of its proper direction.

The lip A, extends entirely across the portion F to which it is attached, and the lip D, on the stationary part, extends from the center pin to the periphery of the circle which it would cut, so that whether the bit is cutting its smallest, or largest, or any intermediate sized hole, the cutting edges of the two bits will form a continuous edge entirely across the hole to be cut, and thus, without tearing the wood or choking the bit, cut out all the wood, leaving a perfectly smooth hole, which has not to my knowledge been done before by any other expansion bit.

Having thus fully described my invention, what I claim therein as new and desire to secure by Letters Patent, is—

1. So forming and combining the movable and stationary parts of an expansion bit for boring different sized holes, as that a cutting edge shall at all times be preserved entirely across the bit, and at the same time the cutting point on the movable part thereof, shall always be parallel with the shank of the bit or the line of the hole, substantially as herein described.

2. I also claim the rising and falling of the movable part of the bit, as it is contracted or expanded, by means of the inclined slots and set screws or their equivalents, so that, the lip on the movable part shall become the cutter, when boring the largest size holes, (the other lip being at rest), and the lip on the stationary part shall become the cutter when boring the smallest size holes, the other lip being at rest, by which means I am able to form the lips of the proper shape for different sized holes without changing the cutters, substantially as described.

CHAS. L. BARNES.

Witnesses:
A. B. STOUGHTON,
L. C. DONN.